United States Patent [19]

Elley

[11] 4,357,819
[45] Nov. 9, 1982

[54] METHOD AND APPARATUS FOR SIMULTANEOUSLY FORMING THREE UNIFORM METAL ROUNDS

[75] Inventor: Dayton W. Elley, Seguin, Tex.

[73] Assignee: Structural Metals, Inc., Seguin, Tex.

[21] Appl. No.: 158,470

[22] Filed: Jun. 11, 1980

[51] Int. Cl.³ ............................ B21B 1/00; B21B 1/18
[52] U.S. Cl. ........................................ 72/204; 72/221; 72/366
[58] Field of Search ................. 72/204, 221, 199, 203, 72/366, 227

[56] References Cited

U.S. PATENT DOCUMENTS

| 885,508 | 4/1908 | McKee | 72/366 X |
| 1,977,285 | 10/1934 | McCleery | 72/204 |
| 4,193,283 | 3/1980 | Bowman et al. | 72/204 X |
| 4,201,075 | 5/1980 | Chumanov et al. | 72/221 |

FOREIGN PATENT DOCUMENTS 39-4243  3/1964  Japan ..................................... 72/204

Primary Examiner—Francis S. Husar
Assistant Examiner—Jonathan L. Scherer
Attorney, Agent, or Firm—Pravel, Gambrell, Hewitt, Kirk & Kimball

[57] ABSTRACT

Method and apparatus for splitting a single metal rod into three equal cross-section areas by passing the rod through pairs of rollers to form three connected equal areas, but not identically shaped strands, then applying a separating force to separate the rods into individual lengths.

8 Claims, 7 Drawing Figures

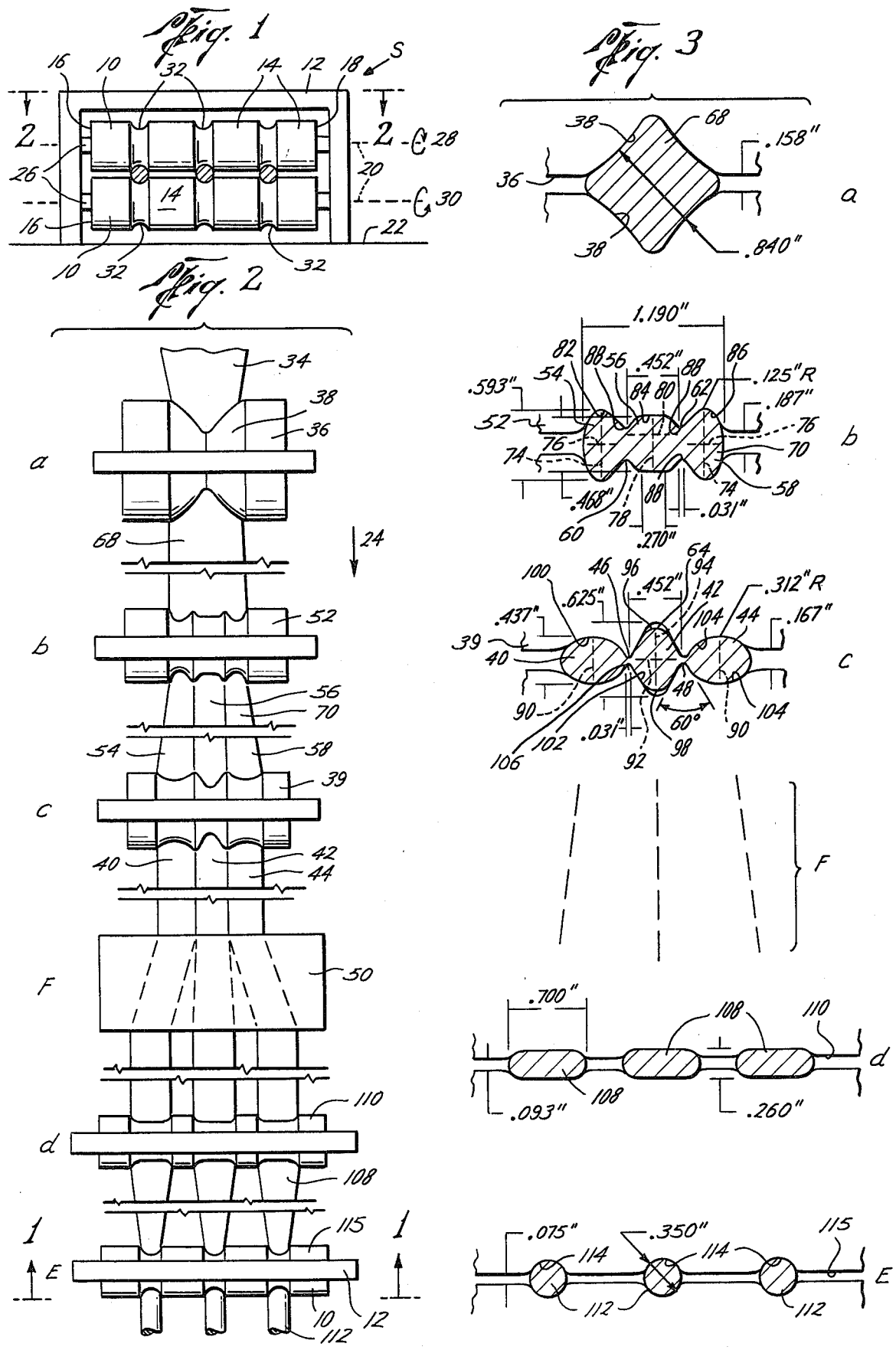

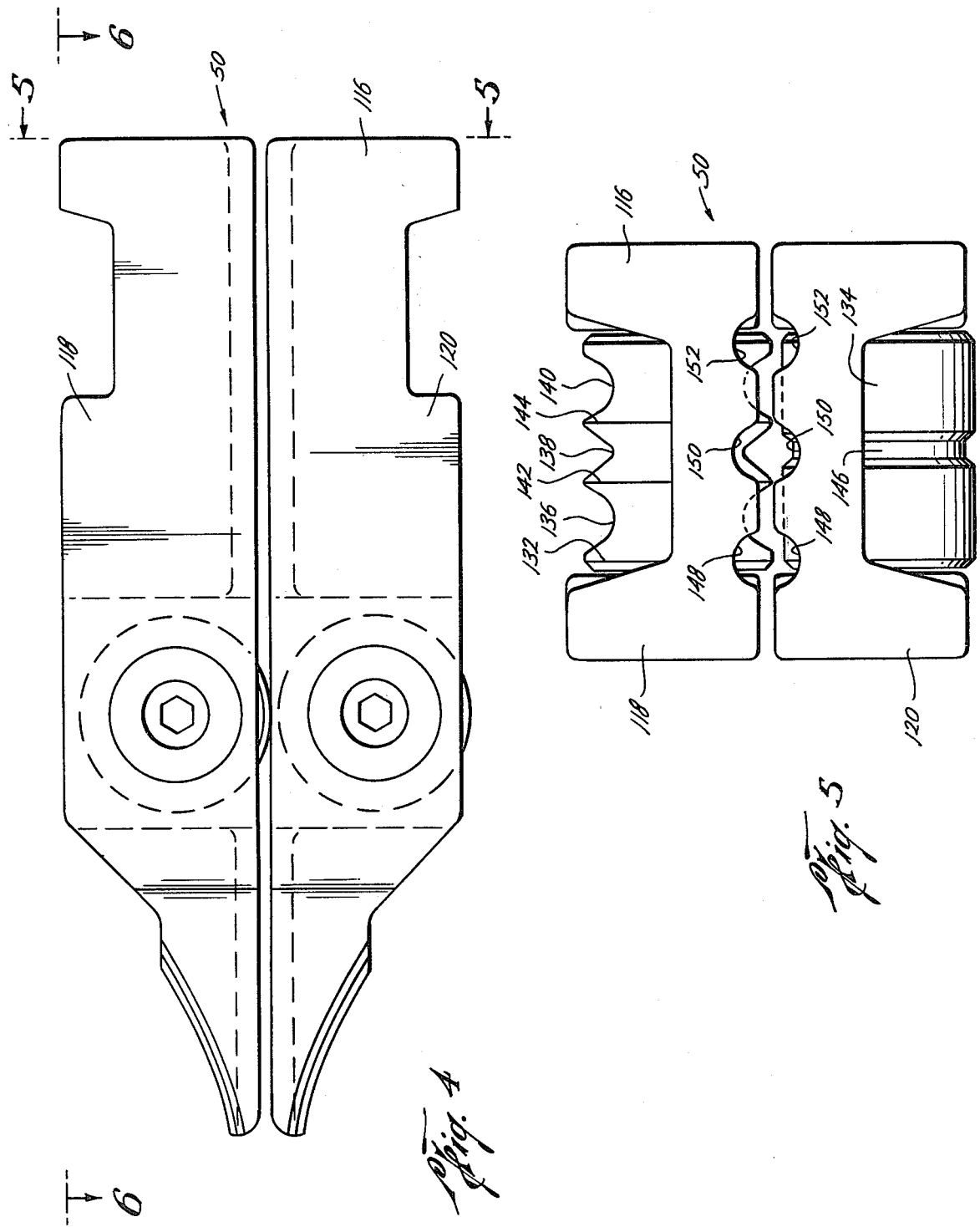

METHOD AND APPARATUS FOR SIMULTANEOUSLY FORMING THREE UNIFORM METAL ROUNDS

FIELD OF THE INVENTION

This invention relates to the forming of small diameter metal rounds such as three-eighth inch reinforcing bar rounds. More specifically, this invention relates to methods and apparatus for simultaneously forming by rolling three rounds of uniform size.

PRIOR ART

The forming of small diameter rounds from larger ingots is well known in the milling arts. Generally, a large ingot is successively passed through a series of rollers that reduce the cross-sectional area of the ingot and, through a number of intermediate steps, eventually forms the desired shape. Because the amount of reduction of the cross-sectional area on each pass through the rollers is limited, the smaller the cross-sectional area of the final product the larger the number of roller passes, machinery and production floor-space required. Further, the smaller the cross-sectional area of the finished product, machinery is required to work at higher speeds and with greater lengths of rod. An example of such a rolling apparatus and procedure is disclosed in U.S. Pat. No. 706,994.

The simultaneous forming of multiple rounds significantly reduces the above-stated problems because the reduction in total cross-sectional area is considerably less, therefore, fewer intermediate steps are required and the speed and length of the end product is reduced by factor equal to the number of multiple rounds. Attempts to create such workable simultaneous multiple strand methods are disclosed in U.S. Pat. Nos. 885,508 and 3,209,452. However, such solutions have several drawbacks including the need for complex machinery, and the inability to produce uniform rounds as an end product. Means to form two rounds simultaneously are known, however, no successful three round method is known. The greatest problem is uniformity of the three strands. Each side or outer strand has an open edge during rolling, but the center strand is captive which tends to lead to non-uniform rounds.

When multiple strands are formed, it is necessary to separate the strands at some stage in the production. Strands are often separated by cutting the connecting portions. U.S. Pat. No. 885,508 discloses a final separation, if necessary, by vertical displacement and suggests the possibility of using lateral displacement. U.S. Pat. No. 281,184 separates strands by vertical alignment of non-aligned strands.

SUMMARY OF THE INVENTION

Three metal rounds are simultaneously formed by forming a single elongated metal rod in a conventional manner than rolling the metal rod to form in the metal rod a cross-section having serially adjacent first, second and third strands of substantially equal areas but not identical shapes. The first strand is connected to the second strand by a first thin connecting portion and the second strand is connected to the third strand by a second thin connecting portion. The three strands are separated along the thin connecting portions and simultaneously rolled into rounds of substantially equal cross-sectional area.

DESCRIPTION OF THE DRAWINGS

FIG. 1 is a schematic front view of a conventional roller stand taken along the line 1—1 of FIG. 2.

FIG. 2 is a schematic top view taken along the line 2—2 of FIG. 1 of the roller stands of the present invention which form the shapes shown in FIG. 3.

FIGS. 3a–3E are detail views of the grooves formed in the rollers and the shapes produced thereby.

FIG. 4 is a side view of the separator means.

FIG. 5 is an end view of the separator means.

PREFERRED EMBODIMENT

Figure 6:
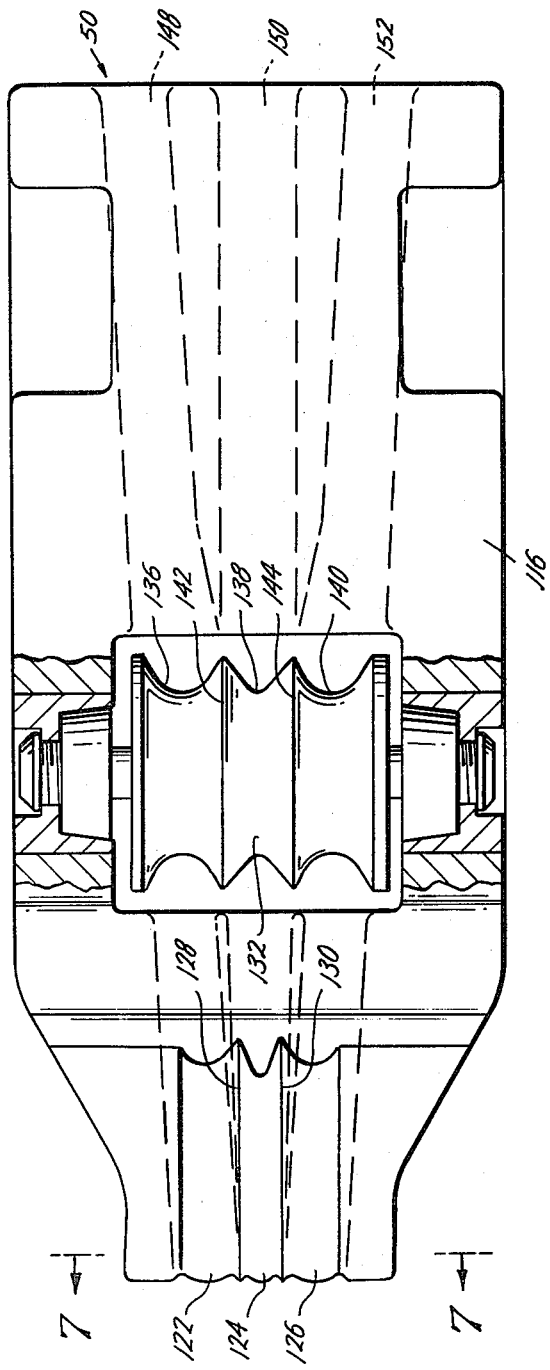
FIG. 6 is a top view of the separator means in partial cutaway.

A conventional roller stand S as used in the present invention is schematically shown in FIG. 1. Two substantially identical cylindrical rollers 10 are mounted within a frame 12. Each cylindrical roller 10 has a cylindrical surface 14 and two transverse ends 16 and 18. The longitudinal axes 20 of the rollers 10 are horizontal to the floor 22, vertically parallel to each other and perpendicular to the movement of the ingots as shown by movement arrow 24 in FIG. 2. The rollers 10 are mounted within the frame 12 on axles 26 which are vertically adjustable within the frame 12 so as to control the distance between the cylindrical surfaces 14 of the rollers 10. The axles 26 are motor driven to provide opposite rotational motion along axes 20 to the rollers 10 in direction of motion arrows 28 and 30. This provides the force to drive the ingot through the roller stand S.

Formed into the cylindrical surfaces 14 of each roller 10 are a series of circumferential grooves 32 perpendicular to longitudinal axes 20. The grooves 32 are cut identically on each roller 10, but vary from each set of rollers. Therefore, a cross-section of the grooves, as seen in detail in FIGS. 3a through 3E, determine what effect the grooves will have upon the metal ingot entering the stand.

As schematically shown in FIG. 2a, a metal rod or ingot 34 moves in the direction of motion arrow 24 entering between first rollers 36 (one shown) along grooves 38 formed in first rollers 36. The metal is drawn through the grooves 38 and assumes the shape of the opposing grooves, as shown in FIG. 3a. The metal rod then proceeds to the next roller stand and, depending on the shape of the grooves, takes on a new cross-section. The motion of the rollers is such to feed the rod in the direction of motion arrow 24. In determining the cross-section of the output of a set of rollers the two controlling factors are the cross-section shape of the grooves cut in the cylindrical surfaces and the distance between the two cylindrical surfaces.

Because of physical limitations, a single roller pass can only reduce an ingot a limited amount in cross-section. It is, therefore, generally impossible to go in one step from the original ingot to the desired final product. Several sequential passes through stands are required to obtain the desired product. The shape of each intermediate product is generally important as a strong final product requires substantially equal working of the metal and alternating horizontal and vertical forces.

In the preferred embodiment of the present invention, a series of passes through roller stands is used to form a rod having a cross-section, as seen in FIG. 3c, with serially adjacent first 40, second 42 and third 44 strands of substantially equal areas but not identical shape. The strands 40, 42 and 44 are connected by a first thin connecting portion 46 and a second thin connecting portion 48. The strands 40, 42 and 44 are then separated along portions 46 and 48 by separator means 50, shown schematically in FIG. 2f and in detail in FIGS. 4–7, which applies a lateral or horizontal separating force to the first, second and third strands substantially perpendicular to the length of the strands. The strands 40, 42 and 44 are then rolled independently but simultaneously and parallel along grooves cut in other rollers in conventional ways to produce the desired final product, as seen in FIGS. 3d and 3E.

A preliminary roller pass, as shown in FIG. 3b, will provide a metal rod suitable for forming the shape shown in FIG. 3c. The preliminary rollers 52 form a rod with serially adjacent first, second and third preliminary strands, 54, 56 and 58 respectively. The first preliminary strand 54 and third preliminary strand 58 are substantially elliptical shaped and the second preliminary strand 56 is substantially rectangular shaped with truncated corners. The first preliminary strand 54 is connected to the second preliminary strand 56 by a first thick connecting portion 60 and the second preliminary strand 56 is connected to the third preliminary strand 58 by a second thick connecting portion 62.

To produce the final uniform rounds with equal cross-sectional area, it may be necessary to make some adjustments to the distance between the rollers. The distance between the preliminary rollers 52, FIG. 3b, may be adjusted until the desired amount of metal is in second preliminary strand 56. Then the distance between the former rollers 39 is adjusted until the cross-sectional areas of the first and third strands 40 and 44 from the former pass is equal to the cross-sectional area of second strand 42. The area of strand 42 will not be changed by relatively small adjustments of the spacing of the former rollers 39. The excess area 64 of the second groove 102 of rollers 39 over the desired cross-sectional area of the second strand 42 allows such adjustment to be made. It may be necessary to make minor adjustments both initially and as wear changes the grooves along the rollers. The excess area 64 provides the necessary area to keep strand 42 from acting as a captive strand.

The exact dimensions of the roller grooves used depend upon the desired end product. As an example, the details of rollers to produce three-eighth inch rounds will be described. It is understood that by the same means, changing only the various dimensions, other rounds of other uniform areas could be formed.

A strand formed by any of well-known conventional steps, suitable to be formed into the shape shown in FIG. 3a, is passed through first rollers 36 with the groove 38 of FIG. 3a to form a single strand 68 as shown in FIG. 3a. The cross-sectional area of strand 68 is a generally square shape with rounded corners and concave sides. The diagonals of strand 68 may be formed vertically and horizontally so as to provide the proper alternating workings of the metal. The distance between the rollers 66 will preferably be approximately 0.158 inches and the distance between the concave sides will be approximately 0.840 inches.

Next the single strand 68 will be passed to the preliminary rollers 52 which will produce a preliminary rod 70 with a cross-section shown in FIG. 3b. This cross-section shape will have three serially adjacent strands 54, 56 and 58. The first and third preliminary strands 54 and 58 form substantially elliptical shapes with a major axis 74 approximately 0.593 inches and a minor axis 76 of approximately 0.369 inches. The major axis 74 is substantially vertical in relation to the floor 22, although it is known in the art to mount rollers vertically, rather than horizontally and, thereby, change the orientation of the various axes without departing from the present invention. The second preliminary strand 56 forms a substantially rectangular shape with truncated corners having a substantially vertical width 78 approximately 0.468 inches, and a substantially horizontal width 80 of approximately 0.452 inches.

The rollers 52 designd to produce this cross-section will have serially adjacent first, second and third preliminary grooves 82, 84 and 86 formed in their surfaces. The first and third grooves 82 and 86 are approximately an elliptical arc having a radius of curvature measured about the major axis 74 of approximately 0.125 inches, a maximum width of approximately 0.369 inches and a maximum depth of approximately 0.20 inches. The second preliminary groove 84 is generally a truncated V-shape having a greatest width of approximately 0.452 inches, a depth of approximately 0.10 inches and a narrowest width of approximately 0.270 inches. The grooves are connected by flat portion 88 having a width of approximately 0.031 inches. The roller surfaces 52 will be spaced approximately 0.187 inches apart.

The forming pass, as shown in FIG. 3c, produces serially adjacent first, second and third strands 40, 42 and 44. The first and third strands 40 and 44 form substantially elliptical shapes with a minor axis 90 of approximately 0.437 inches and a radius of curvature measured about the minor axis 90 of approximately 0.312 inches. The minor axis is substantially vertical. The second preformer strand forms a substantially diamond shape with a minor diagonal 92 of approximately 0.452 inches and a major diagonal 94 of less than approximately 0.625 inches with the ends 96 and 98 along the major diagonal 94 being rounded. The major diagonal 94 is vertical.

The former rollers 39 designed to produce this cross-section will have serially adjacent first, second and third former grooves 100, 102 and 104 formed in their surfaces. The first and third grooves 100 and 104 are approximately an elliptical arc having a radius of curvature measured about the minor axis 90 of approximately 0.312 inches and a maximum depth of approximately 0.2 inches. The second former groove 102 is generally V-shaped with a rounded vertex having a greatest width of approximately 0.425 inches and a depth of approximately 0.3 inches. The grooves are connected by flat portions 106 having a width of approximately 0.031 inches. The roller 3a surfaces may be adjusted, as disclosed above, to provide equal area final products. It is desirable that the thin connecting portions 46 and 48 be easily tearable so the flat portions 106 are spaced less than 0.03 inches apart. The surfaces exterior to the grooves may be placed approximately 0.167 inches apart. The angle of separation as grooves 100 and 102 approach and as grooves 102 and 104 approach is approximately 60 degrees.

The rod leaving rollers 39 will enter into separator means 50 where, by the application of lateral or horizontal forces along the surfaces of the strands separated at 60 degree angles, the thin connecting portions 46 and 48 will be torn and the strands separated. The strands then continue in parallel through additional passes, shown in FIGS. 3d and 3E, wherein by conventional means they are formed into the desired rounds.

The next pass, shown in FIG. 3d, produces three generally rectangular strands 108 with rounded corners having equal cross-section areas. The strands will have a width of approximately 0.70 inches and a depth of approximately 0.260 inches. The rollers 110 will, in general, be approximately 0.093 inches apart.

The final pass to produce the desired rounds, as seen in FIG. 3E, will produce uniform metal rounds 112 with a diameter of approximately 0.350 inches. The grooves 114 formed in rollers 115 will have a radius of curvature of approximately 0.175 inches. The rollers 15 will be separated by approximately 0.075 inches.

Separator Means

Figure 7:
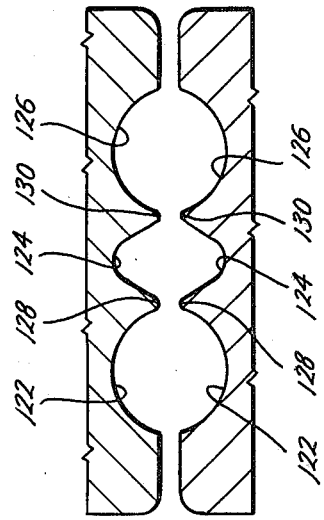
FIG. 7 is a view of FIG. 6 along line 7—7.

The separator means 50 has a housing 116 with a top portion 118 and a bottom portion 120. The top and bottom portions 118 and 120 are generally symmetrical. Each has entry grooves or guides 122, 124 and 126 adapted for strands 44, 42 and 40 respectively exiting from the former pass. The entry grooves 122, 124 and 126, as seen in FIG. 7, will start separation and guide the rod onto separation rollers.

Between the grooves 122, 124 and 126 are the separating ridges 128 and 130. The width of the ridges 128 and 130 increases along the length of the entrance guides 122, 124 and 126. As that width increases and becomes equal to the width between the strands 40, 42 and 44, a lateral or horizontal force will be applied perpendicular to the sides of the strands 40, 42 and 44 along their length as they move along the ridges 128 and 130. This lateral or horizontal force will tear the thin connecting portions 46 and 48, thereby separating the strands. The separated strands will then enter onto the rollers 132 and 134. The rollers are not symmetrical, as seen in FIG. 5. The top rollers 132 has grooves 136, 138 and 140 generally similar to the entrance guide grooves and top roller separating ridges 142 and 144. The bottom roller has only one central groove 146. Because the angle of separation of grooves 136, 138 and 140 is greater than the angle of separation of entry guide grooves 122, 124 and 126, as the torn strands enter between the rollers 132 and 134, the tearing and the horizontal force applied to the strands takes place on roller 132. Therefore, the entry guides 122, 124 and 126 will no longer be applying the lateral or horizontal tearing force. This has the advantage of avoiding spot welding and heat buildup along the point of tearing as that point will be constantly changing along the circumference of the rollers. From the rollers 132 and 134, the strands will enter exit guide grooves 148, 150 and 152 formed in the top and bottom portions 118 and 120, wherein they will be guided to the next pass as seen in FIG. 1d. Thereby, a separating force will be applied to the strands to separate them and to prepare them for simultaneous production of three metal rounds of equal cross-sectional area.

The foregoing disclosure and description of the invention are illustrative and explanatory thereof and various changes in the size, shape and materials as well as the details of the illustrated construction may be made without departing from the spirit of the invention.

I claim:

1. A method for simultaneously forming three uniform metal rounds from a single rod, comprising the steps of:
   (1) forming a single elongated metal rod;
   (2) rolling said metal rod to form in said metal rod a cross-section having serially adjacent first, second and third strands of substantially equal areas but not identical shapes, said first strand connected to said second strand by a first thin connecting portion and said second strand connected to said third strand by a second thin connecting portion;
   said first and third strands form substantially identical elliptical shapes with a minor axis of approximately 0.437 inches and a radius of curvature measured about said minor axis of approximately 0.312 inches, said minor axis being vertical;
   said second strand forms a substantially diamond shape with a minor diagonal of approximately 0.452 inches and a major diagonal of less than approximately 0.625 inches with the ends along said major diagonal rounded, said major diagonal being vertical;
   said first and second strands and said second and third strands have approximately a 60° angle of separation;
   said thin connecting portions have a width of approximately 0.031 inches;
   (3) separating said strands along said thin connecting portions; and
   (4) simultaneously rolling each of said strands into rounds of substantially equal cross-sectional area.

2. A method for simultaneously forming three uniform metal rounds from a single rod, comprising the steps of:
   (1) forming a single elongated metal rod;
   (2) preliminarily rolling said metal rod to form in said metal rod a cross-section having serially adjacent first, second and third preliminary strands;
   said first preliminary strand connected to said second preliminary strand by a first thick connecting portion and said second preliminary strand connected to said third preliminary strand by a second thick connecting portion;
   said first and third preliminary strands from substantially elliptical shapes;
   said second preliminary strand forms a substantially rectangular shape with truncated corners;
   (3) rolling said metal rod to form in said metal rod a cross-section having serially adjacent first, second and third strands of substantially equal areas but not identical shapes, said first strand connected to said second strand by a first thin connecting portion and said second strand connected to said third strand by a second thin connecting portion;
   (4) separating said strands along said thin connecting portions; and
   (5) simultaneously rolling each of said strands into rounds of substantially equal cross-sectional area.

3. The method of claim 2, wherein said preliminary rolling step further comprises:
   preliminary rolling said rod such that said first and third preliminary strands form substantially elliptical shapes with a major axis of approximately 0.593 inches, a minor axis of approximately 0.369 inches and a radius of curvature about said major axis of approximately 0.125 inches, said major axis being substantially vertical; and
   said second preliminary strand forms a substantially rectangular shape with truncated corners having a substantially vertical length of approximately 0.468 inches and a substantially horizontal length of approximately 0.452 inches.

4. The method of claim 2, wherein said separating step comprises:
applying lateral separating forces to said first, second and third strands substantially perpendicular to said length of said strands.

5. The method of claim 2, further comprising the step of:
providing space for the non-captive rolling of said second strand.

6. Apparatus for simultaneously forming three metal rounds, comprising:
a pair of preliminary rollers;
each of said preliminary rollers having identical cylindrical surfaces with serially adjacent first, second and third grooves formed therein perpendicular to the longitudinal axis of said preliminary rollers;
said first and third grooves being approximately an elliptical arc having a radius of curvature measured about the major axis of approximately 0.125 inches, a maximum width of approximately 0.369 inches and a maximum depth of approximately 0.203 inches; and
said second groove being generally a truncated V-shape, having a greatest width of approximately 0.452 inches, a depth of approximately 0.100 inches and a narrowest width of approximately 0.270 inches.

7. Apparatus for simultaneously forming three metal rounds, comprising:
a pair of forming rollers;
each of said forming rollers having identical cylindrical surfaces with serially adjacent first, second and third grooves formed therein perpendicular to the longitudinal axis of said forming rollers;
said first and third grooves being approximately an elliptical arc having a radius of curvature of approximately 0.312 inches measured about the minor axis, a greatest width of approximately 0.437 inches and a maximum depth of approximately 0.125 inches;
said second groove being generally a rounded V-shape having a maximum width of approximately 0.425 inches and a maximum depth of approximately 0.312 inches;
said first and second grooves connected by a flat portion with a width of approximately 0.031 inches; and
said second and third grooves connected by a flat portion with a width of approximately 0.031 inches.

8. Separating means for use in simultaneously forming three metal rounds, comprising:
a housing with a top housing portion and a bottom housing portion;
each housing portion having first, second and third entry guide grooves and first, second and third exit guide grooves;
a first separating ridge formed between said first and second entry guide grooves for providing horizontal tearing force;
a second separating ridge formed between said second and third entry guide grooves for providing horizontal separating force;
a roller mounted within said housing portion between said entry guide grooves and said exit guide grooves, perpendicular to said entry guide grooves and said exit guide grooves;
third and fourth separating ridges formed in one of said rollers for providing further horizontal separating force; and
said top housing portion and said bottom housing portion adapted for mounting so that said entry and exit guide grooves cooperate to form guides for a three strand metal rod to be separated.

* * * * *